UNITED STATES PATENT OFFICE.

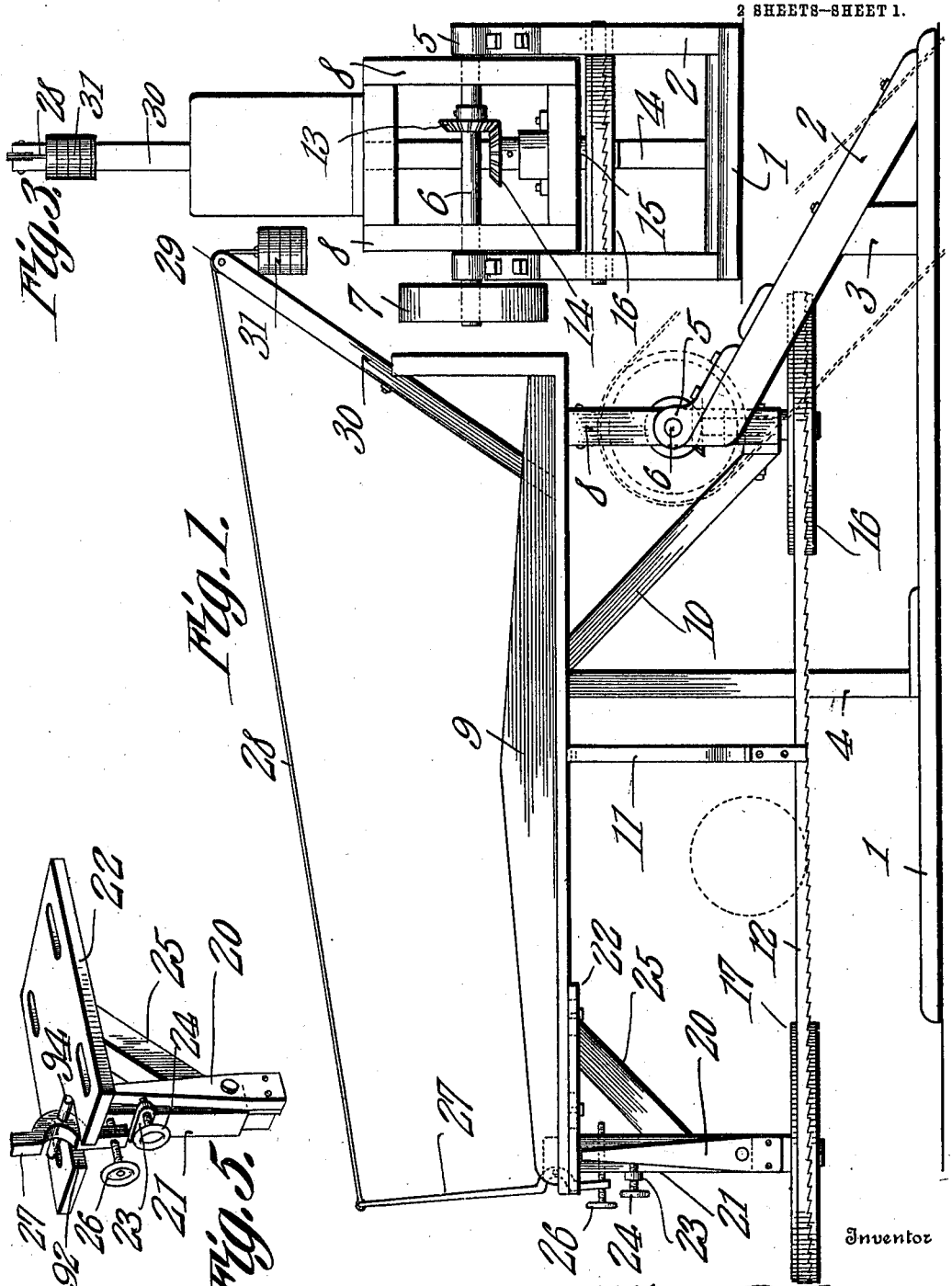

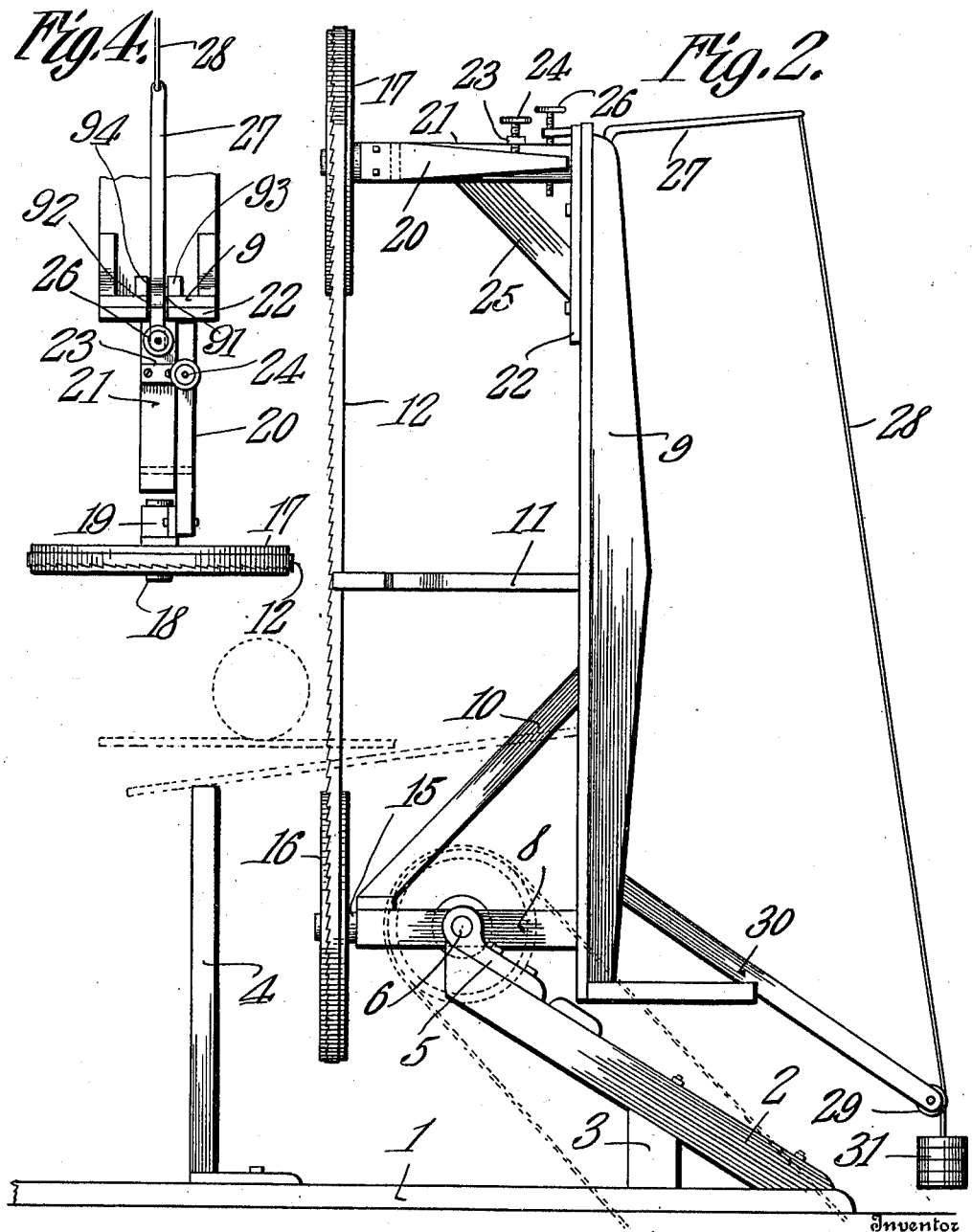

WILLIAM B. HEYER, OF NEWPORT, VERMONT.

BAND-SAW.

978,374.

Specification of Letters Patent. Patented Dec. 13, 1910.

Application filed July 7, 1909. Serial No. 506,350.

*To all whom it may concern:*

Be it known that I, WILLIAM B. HEYER, a citizen of the United States, residing at Newport, in the county of Orleans and State of Vermont, have invented a new and useful Band-Saw, of which the following is a specification.

This invention relates to wood sawing, and more especially to band saw machines;
and its object is to improve the tension device therein.

To this end the invention consists broadly of a single beam supporting both saw pulleys and the tension device, whereby the beam may be mounted so as to swing and cause the saw blade to move through the path desired; and the invention consists specifically in the connection between the tension device and the bearing of one pulley and in the means for permitting the removal of said connection without the detachment of other parts—all as more fully described below.

In the drawings, Figure 1 is a side elevation of an apparatus embodying my present invention and showing the band saw disposed to operate in a horizontal plane. Fig. 2 is a similar view showing the saw arranged to operate in a vertical plane. Fig. 3 is an end elevation. Fig. 4 is a front end elevation, and Fig. 5 is a detail perspective view of the saw tension device.

The supporting frame of the machine comprises a base plate 1, and a pair of braces 2 disposed at one end of the base plate and extending upward therefrom in an oblique position, and supported on short posts 3 rising from the base plate near the end of the same, as clearly shown. At an intermediate point of the base plate, a standard 4 is erected so as to furnish an additional support for the saw-carrying frame when the same is in its lowered position. At the upper ends of the braces 2, I secure journal boxes 5 in which the driving shaft 6 is mounted, as clearly shown, and upon one end of the said driving shaft a band pulley 7 may be secured in order to impart power to the said driving shaft from any convenient motor. In the drawings, I have illustrated a driving belt running from the band pulley to a point below the floor of the room in which the sawing apparatus is placed. The driving shaft 6 passes through the side bars 8, of a rectangular frame forming a part of the carrying frame for the saw. This end frame is loosely fitted upon the driving shaft so that it may be swung upon the said shaft as a pivotal center, and across the upper side of the said frame a beam 9 is secured and projects forward a distance necessary for the proper support of the saw to be used. Braces 10 are secured to the lower end of the end frame 8 and to the beam 9 so as to impart the proper strength and rigidity to the structure, and the said beam when in its lowered position is arranged to rest upon the upper end of the standard 4, as clearly shown in Fig. 1. At about the center of the beam 9 a depending guide 11 is secured having its lower end suitably shaped to fit over the saw band 12 and thereby prevent lateral swaying or bending of the saw.

A beveled pinion 13 is secured upon the driving shaft 6 and meshes with a similar pinion 14 which is secured to the upper end of a shaft 15 mounted in the lower bar of the end frame 8, and having a saw carrying pulley 16 on its lower end. The saw 12 passes around this pulley 16 and also around a similar pulley 17 which is carried by the outer free end of the beam 9, and is capable of adjustment so that the saw will be held in the proper frictional engagement with both pulleys 16 and 17 so as to be set in motion by the rotation of the said pulleys. The pulley 17 is secured on a stub shaft 18 which is journaled in a box 19 secured to the lower end of an arm 20 which is pivotally secured to a depending post 21 near the lower end of the same, the said post being disposed at or near the outer end of a plate 22 which is slidably secured to the under side of the beam 9 at the outer end of the same. The beam and the plate have registering notches 91 and 92 opening through their outer ends, and alongside the notch 91 in the beam are upright ears 93. A bracket 23 is secured to the outer side of the post 21, and an adjusting screw 24 is mounted in the end of the said bracket and bears against the arm 20 near the upper end of the same so that by adjusting the said screw 24 the arm 20 may be turned on its pivot to properly adjust the saw pulley 17. The post 21 is connected with the plate 22 by a brace 25 so as to prevent bending or yielding of the said post under the strain transmitted thereto from the saw, and near its upper end the post is connected by means of an adjusting screw 26 with a compensating lever 27 which extends through the notches 91, 92 and on a pin 94 through said ears 93 is journaled upon the upper side of the beam 9 at the outer end of the same, and projects upward. Hence by disengaging the pin 94 from the ears 93 and disconnecting the ends of the lever, it can be removed from the notches without detaching the plate or other parts from the beam. A cable 28 is attached to the upper end of the lever 27 and extends rearward therefrom over a pulley or roller 29 at the upper end of a bracket or arm 30 rising from the beam 9, and a counter weight 31 is attached to the end of the said cable so as to hold the same taut and maintain the lever 27 in its proper position thereby keeping the saw under tension.

From the foregoing description, taken in connection with the accompanying drawings, it is thought the operation and advantages of my improved band sawing machine will be readily appreciated. The logs or blocks to be cut up are fed to the machine over any convenient or suitable table or carriage, and power is imparted to the saw through the band pulley 7 and driving shaft 6 with the meshing pinions 13 and 14, as before stated, and as will be readily understood. The pulley 16 will thus be set in motion, and the saw 12 bearing against the edge of the said pulley will be moved therewith through the frictional contact. It will be observed that the machine may be turned into a vertical position, as shown in Fig. 2 or may be swung on the driving shaft as a center so as to assume a horizontal position, as shown in Fig. 1, and this swinging adaptability of the apparatus permits it to automatically feed or follow the cut through the log being acted upon, it being understood that the saw carrying frame may be raised to any position between the horizontal and the vertical, so that the edge of the saw will rest against the block or log, and the weight of the said frame will then force the saw through the block as the same is cut. It will also be noted that the teeth of the saw are arranged on the under side of the same when in the horizontal position so that the danger of accident through persons falling upon the saw is reduced. The counter weight 31 acting upon the compensating lever 27 will serve to hold the saw to its work and resist the tendency of the same to buckle or stretch, inasmuch as the tendency of the counter weight will be to draw the upper end of the said lever rearward and consequently swing the lower end of the same outward thereby pulling the adjusting frame consisting of the post 21 and the plate 22 outward toward the free end of the beam 9, consequently moving the arm 20, and the pulley 17 carried by the lower end thereof, away from the pulley 16 so as to hold the saw taut at all times.

Having thus described my invention, what I claim is:

In a band sawing machine, the combination with a normally horizontal beam having a notch opening out one end, ears at opposite sides thereof, an upright rotary shaft at its other end, a saw pulley carried by the shaft, a plate slidably mounted beneath and having a notch registering with that in the beam, a post depending rigidly from the plate, a box below the post, a stub shaft journaled therein, a saw pulley on said shaft, a band saw connecting the pulleys, and means for adjusting the box with relation to the post; of a lever extending through said registering notches, a pin through the lever and journaled in said ears, adjustable connections between the lower end of the lever and said post, and tension devices supported by the beam and connected with the upper end of the lever.

In testimony that I claim the foregoing as my own, I have hereto affixed my signature in the presence of two witnesses.

WILLIAM B. HEYER.

Witnesses:
S. W. KEITH,
H. C. ALLBEE.